Jan. 4, 1949.                F. J. WARCUP                2,458,230
                   CLEANING MEANS FOR BEER DISPENSERS
                         Filed Sept. 8, 1945
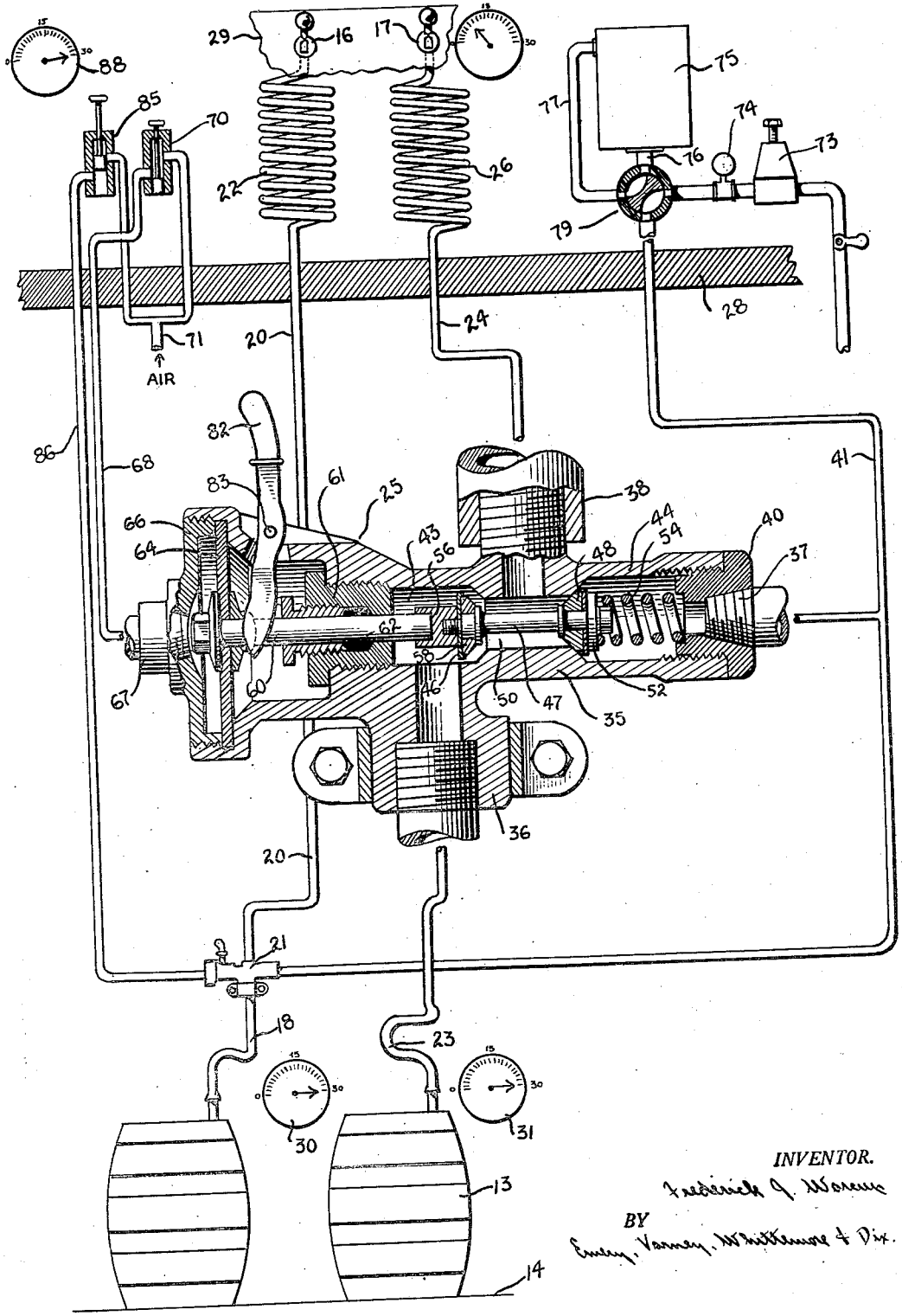
INVENTOR.
Frederick J. Warcup
BY
Emery, Varney, Whittemore & Dix Patented Jan. 4, 1949

2,458,230

UNITED STATES PATENT OFFICE 2,458,230

CLEANING MEANS FOR BEER DISPENSERS

Frederick J. Warcup, Nyack, N. Y.

Application September 8, 1945, Serial No. 615,207

4 Claims. (Cl. 225—12)

This invention relates to beer distributing at taverns, bars and other establishments where draught beer is served.

It is an object of the invention to provide an improved method for distributing beer from a keg. Another object is to provide a beer distributing method in which beer lines can be washed out conveniently when tapping a new keg, and at any other time without interfering with the connection of the line to the keg.

One feature of the invention relates to a method for cleaning beer lines selectively from a common source of cleaning solution and without interfering with the operation of the lines that remain in use.

When distributing beer in accordance with this invention, water and beer are often in different parts of the distributing line at the same time; and the pressure of the water is correlated with the pressure of the beer so that any beer line can be used intermittently for supplying beer to a tap up until the time that a line is completely filled with water. This makes it possible to turn water into a line at a point near the keg shortly before a tavern closes for the night, and the beer remaining in the line can be served to the customers until the line is full of water. No beer is wasted, therefore, and no beer remains in the line overnight.

If the bartender has orders for one or more glasses of beer after he has filled the lines with water, it is possible with this invention to bring one or more glasses of beer up the line from a keg without filling the complete length of the line with beer and without interfering with the running of the beer at the ideal pressure.

Another object of the invention is to provide improved apparatus for distributing beer and for washing out beer lines. The apparatus includes valve means by which either beer or water can be supplied to a beer line from a location close to the keg, and the beer pressure at the tap maintained substantially constant whether the beer is flowing to the tap from the keg, or being displaced from the line by a column of water introduced into the lower part of the beer line after the line has been shut off from the keg.

The invention provides valve means for flushing out both the beer line leading to the tap and the beer rod or other connection by which the beer line is connected with a keg.

Other objects, features and advantages of the invention will appear or be pointed out as the description proceeds.

The drawing is a diagrammatic illustration of a beer distributing system embodying this invention, with gages showing illustrative pressures existing in the system at various locations.

The drawing shows two beer kegs 12 and 13 located on a floor 14 in the basement of a tavern. Beer from the keg 12 is supplied to a tap 16 on a bar located on the ground floor of the tavern. Beer from the keg 13 is supplied to another tap 17 on the bar.

The keg 12 is connected with the tap 16 through a beer rod and hose 18, and a beer line 20 that includes a valve 21 and a cooling coil 22.

The other keg 13 is connected with the tap 17 through a similar beer rod, hose 23, and a beer line 24 that includes a valve 25 and cooling coil 26. The valve 25 is shown on a greatly enlarged scale and in section to illustrate the interior working parts. It will be understood that the cooling coils 22 and 26 are enclosed in refrigerating apparatus in accordance with conventional practice. The connections of the beer lines to the kegs may be by beer rods or other fittings.

The floor of the bar level of the tavern and the ceiling of the basement in which the beer kegs 12 and 13 are located is shown in section and indicated by reference character 28. The taps 16 and 17 are located on the bar 29 at a level several feet above the floor 28.

The pressure in the beer distributing system, at various locations, is indicated by gage diagrams. The pressure in the kegs 12 and 13 is indicated by the gage diagrams 30 and 31, both of which indicate a pressure of 30 lbs. per square inch. This pressure in the kegs forces the beer up through the beer lines 20 and 24, but the pressure in the beer lines is progressively less at the higher levels because of the weight of the column of beer that is contained in each of the beer lines. The weight of beer is substantially the same as water and if the taps 16 and 17 are located 12 ft. above the level of the beer in the kegs 12 and 13, the loss of pressure head caused by the weight of the beer columns amounts to approximately 6 lbs. per square inch.

When beer is drawn from the taps 16 and 17, there is a still greater drop of pressure because of friction losses in the beer lines. Even though the distance from each tap to its corresponding keg is only 12 ft., the tubing in the cooling coils 22 and 26 increases the total length of each of the beer lines to approximately 50 ft. and causes an additional loss of head of 10 lbs. per square inch with ⅜ inch tubing, this being the standard size of tubing used for beer distributing lines. The beer flows from the tap at a pressure of approximately 14 lbs. per square inch. This is an ideal pressure for the usual beer and results in just the right amount of foaming.

These figures on pressure, length of line, and pressure drop are merely illustrative. Pressure in the beer kegs varies over some range depending upon the temperature of the beer and the pressure of the gas or air supplied to the kegs from a compressor such as used at taverns. Beer can be drawn at somewhat different pressures but the range is narrow for ideal drawing conditions, that is, conditions under which the beer will contain the correct amount of gas and yet not be wild and foam excessively as it flows from the tap into a glass or stein.

The valves 21 and 25 are for the purpose of disconnecting the beer lines 20 and 24 from their respective kegs 12 and 13, and introducing water into the beer lines. The valve 25 will be described, and it will be understood that the valve 21 is of similar construction.

The valve 25 includes a valve casing 35 having a beer inlet opening 36, a water inlet 37 and a center outlet 38 that communicates with the beer line 24. The water inlet 37 is formed in a cap 40 that connects with a water line 41 and screws into one end of the valve casing 35.

There are two valve chambers 43 and 44 in the valve casing 35. Within the valve chamber 43 there is a valve element 46 connected by a stem 47 with another valve element 48 which is located in the valve chamber 44. A connecting conduit 50, between the valve chambers 43 and 44, communicates with the center outlet 38.

At the right-hand end of the valve stem 47 there is a nut 52 that threads on the end of the valve stem. This nut is shaped to serve as a guide for holding a spring 54 centered with respect to the axis of the valve stem 47. The spring 54 is compressed between the nut 52 and the cap 40 which has a recess in its inner face for holding the righthand end of the spring in line with the axis of the valve stem 47. There are valve seats in each of the valve chambers 43 and 44 on opposite ends of the conduit 50, and the spring 54 urges the valve element 48 into contact with its valve seat to shut off communication between the chamber 44 and the conduit 50.

A connector 56 has one end threaded to screw on the left hand end of the valve stem 47. This connector, like the nut 52, clamps its adjacent valve element against a flange of the valve stem 47 and holds a retainer 58 against the back of the valve element 46. The purpose of the retainer 58, which has a peripheral rim overlapping the valve element 46, is to prevent the valve element from spreading as the result of continued use; and such a retainer makes it possible to employ softer rubber for the valve elements. In the preferred embodiment of the invention the valve elements 46 and 48 preferably are made of medium soft rubber.

A plunger 60 fits within a socket in the container 56 and extends through a stuffing box 61 containing packing 62. The other end of the plunger 60 is secured to a diaphragm 64, the peripheral margin of which is clamped in the end of the valve casing 35 by end plug 66 that threads into the left end of the valve casing.

A fitting 67 on the end of the plug 66 connects with a line 68 through which compressed air is supplied to the space between the diaphragm 64 and the end plug 66. The diaphragm 64 and its associated parts provide a servo motor for closing the valve element 46 and opening the valve element 48 against the pressure of the spring 54. As long as compressed air is supplied to the air line 68 the valve element 46 is held closed and the valve element 48 open.

When the valve elements 46 and 48 are in the positions shown in the drawing, beer from the keg 13 is forced upward through the beer inlet 36, past the open valve element 46, through the conduit 50, and center outlet 38 to the beer line 24 and tap 17. When the bartender is almost ready to close down for the night, he operates an air valve 70 to connect the compressed air line 68 with an air-supply line 71 leading from a compressor or storage tank, and the air displaces the diaphragm 67 and closes the valve element 46 so as to shut off the keg 13 from the beer line 24.

At the same time that the valve element 46 is closed, the valve element 48 is opened and water from the water supply line 41 flows into the valve chamber 44 and exerts pressure against the beer contained in the conduit 50, outlet 38 and beer line 24. The pressure of the water in the line 41 is controlled by an adjustable regulator 73. The delivery pressure of the regulator 73 is indicated by a gage 74. The regulator is adjusted so that the water pressure in the chamber 44 is of the same order as the beer pressure in the chamber 43. This pressure is somewhat less than the pressure at the keg 31 because of the elevation of the valve casing 35 above the level of the beer in the keg.

By the expression "of the same order" as used herein with reference to the beer and water pressure, it is meant that the water pressure is not more than 5 lbs. per square inch higher than the beer pressure or more than 3 lbs. per square inch less than the beer pressure. In the preferred embodiment of th invention the regulator 73 supplies water with a pressure at the valve casing 35 that is within 2 lbs. per square inch of the beer pressure in the chamber 43.

It might be supposed that the pressure of the water in the chamber 44 need not be related to the pressure of the beer in the chamber 43 since the latter chamber is shut off from the conduit 50 when the valve element 48 is open to supply water to this conduit 50. Such is not the case, however, because there is a substantial amount of beer in the beer line 24, including the coil 26, when the bartender operates the valve means to connect the beer line 24 with the water supply line 41. In an average beer system there are about six glasses of beer in the coil 26 and beer line 24 between the valve casing 35 and the tap 17.

The bartender operates the tap 17 to supply beer to customers, after the beer line has been connected with the water supply, and the pressure of the water behind the beer forces the beer up in the line 24 to the tap 17 in the same way as the beer would be forced up by pressure from the keg 13. If the water pressure behind the beer is too high the beer foams excessively as it comes from the tap 17 and it is impossible to draw a glass of beer without excessive waste. If the water pressure is too low, the beer flows very slowly, foams in the line, and has a tendency to be flat.

After all of the beer in the beer line 24 has been expelled by the water behind it, water flows from the tap 17, and the bartender closes the tap and permits water to stand in the beer line overnight. If the bartender finds that he has turned water into the beer line too soon, that is, he has further demands for beer after the last beer line is filled with water, he can introduce one, two or a larger number of glasses of beer into the beer line without again filling the line completely with beer.

This is done by pulling up the handle of an air valve 70 so that the line 68 from the valve is shut off from the air supply line 71 and air from the servo motor of the valve casing 35 is allowed to exhaust through the line 68 and lower end of the valve casing of air valve 70. The spring 54 pushes the valve elements 46 and 48 back into the positions shown in the drawing, and the tap 17 is then opened long enough to allow one, two or more glasses of water to flow from the tap depending upon how many glasses of beer the bartender wants to introduce into the beer line 24.

As the water flows from the tap 17, beer from the keg 13 and hose 23 flows through valve chamber 43 and through the conduit 50 and outlet 38 to replace the water withdrawn at the tap 17. When two glasses, for example, have flowed from the tap 17, the bartender will depress the handle of the air valve 70 and operate the valve means in the casing 35 so as to again connect the beer line 24 with the water supply line 41. The tap is again opened and water allowed to flow until the beer contained in the line reaches the tap. The tap is then operated to draw the two glasses of beer desired, and the beer line is again full of water and ready to be shut down for the night.

The apparatus shown in the drawing also includes means for cleaning the beer line with a chemical cleaner, such as tri-sodium phosphate. The chemical cleaner is placed in a tank 75 which has an inlet 76 and an outlet connection 77 communicating with different ports of a four way valve 79. When the valve 79 is in the position shown in the drawing, water flows from the regulator 73 to the water line 41 without passing through the regulator tank 75. Rotation of the valve 79 through an angle 90° shifts the passages in the valve so that water from the regulator 73 flows through the valve 79 to the inlet 76 of the chemical tank 75, and from the chemical tank 75 through the outlet connection 77 and through the valve 79 to the water line 41. In passing through the tank 75 the water dissolves the tri-sodium phosphate and forms a cleaning solution that is carried through the valve casing 35 and into the beer line 24 and through the coil 26.

When tapping a new keg, it is desirable to wash out the beer rod or other fitting that connects with the keg, and also the tubing 23 between the valve casing 35 and the beer rod. In order to have water from the water line 41 flow down through the beer rod it is necessary to have both of the valve elements 46 and 48 in open position at the same time. This result is obtained by first supplying air behind the diaphragm 64 so that the servo motor closes the valve element 46 and opens the valve element 48 to connect the beer line with the water supply. A handle 82, connected to the valve casing 35 by a pin 83, is then operated manually to push the diaphragm 64 back against the pressure of the air, and by controlling the displacement of the handle 82 the diaphragm can be moved just enough to cause both of the valve elements 46 and 48 to be open half way at the same time. This permits water to flow from the water supply line 41, through the valve casing 35 and down through the tubing 23 and the beer rod.

The valve casing 21 is connected with the air supply line 71 through a valve 85, that corresponds to the valve 70, and an air line 86 which corresponds to the air supply line 68. The pressure of the air at the valves 70 and 85 is indicated by the dial diagram 88 and this pressure is substantially equal to the pressure in the beer kegs 12 and 13 so that the same air can be used for the beer kegs as for the servo motors. Air connections to the beer kegs are not shown. Some places use carbon dioxide in place of air, and if the air supplied to valves 70 and 85 is not from the same source as supplies compressed air or gas to the beer kegs, then any desired pressure can be used for the air lines 68 and 86 provided that the diaphragms of the servo motors are large enough, with the given air pressure, to exert sufficient force to compress the spring 54 that normally holds the valve means in position to connect the beer line with the keg. The handle 82 must be long enough to provide sufficient leverage to push the diaphragm back against the pressure of the air.

Various changes and modifications can be made in the invention, and some features can be used without others, without departing from the invention as defined in the claims.

I claim as my invention:

1. A beer distributing system including a valve casing, a conduit connecting the valve casing with a beer line leading to a tap, another conduit connecting the valve casing with a keg, a third conduit through which the valve casing communicates with a water supply line, two interconnected valve means in the casing, one of which is operable to put the beer line into communication with the keg, and the other of which is operable to put the beer line into communication with the water supply line, a lever that rocks about a fulcrum on the valve casing, and an operative connection between the lever and the valve means for shifting the valve means into position to put the water supply line conduit in communication with the conduit that connects the valve casing with the keg while still leaving the valve means in a position to supply water from the water supply line to the beer line.

2. In a beer distributing system, a valve casing, separate conduits in the valve casing communicating respectively with a beer line to a tap, a line connecting with a keg, and a water supply line, valve means within the casing movable into different positions for putting the beer line in communication with either the keg or the water supply line, a spring for holding the valve means in position to put the beer line in communication with the keg, a servo motor for moving the valve means against the pressure of the spring and into position to put the beer line in communication with the water supply line, and a manually-operated actuator for shifting the valve means into an intermediate position that puts the water supply line in communication with both the beer line and said line connecting with the keg.

3. Valve means for a beer distributing system, said valve means including a casing in which there are two valve chambers joined by a connecting conduit, valve seats at both ends of said conduit, a single valve comprising valve elements in the respective valve chambers and a valve stem connecting the valve elements and that is slightly longer than the connecting conduit so that both of said valve elements cannot contact with their valve seats at the same time, a conduit through which one of the valve chambers communicates with a line to a keg, a conduit through which the other of said valve chambers communicates with a water supply line, an outlet conduit leading to a beer line from the connecting conduit between the valve chambers, a spring urging one of the valve elements against its seat, a servo motor for moving the other valve element against its seat, and other means for holding the valve elements in an intermediate position with both of the valve elements spaced from their valve seats.

4. A beer distributing system including valve means that connect with a line to a keg, a water supply line, and a beer line leading to a tap, said valve means being movable through a stroke and being effective at one end of its stroke to shut off the beer line from the keg and put said beer line in communication with the water supply line, said valve means being effective at the other end of its stroke to shut off the beer line from the water supply line and put said beer line in communication with the keg, and an operator-actuated element on the valve means for moving the valve means into an intermediate position that established simultaneous communication between the water supply line and both the beer line and the line leading to the keg.

FREDERICK J. WARCUP.

REFERENCES CITED

The following references are of record in the file of this patent:

UNITED STATES PATENTS

| Number | Name | Date |
| --- | --- | --- |
| 596,432 | Cronin | Dec. 28, 1897 |
| 877,043 | Bowers | Jan. 21, 1908 |
| 2,022,952 | Cohen | Dec. 3, 1935 |
| 2,066,397 | Fogarty | Jan. 5, 1937 |
| 2,189,448 | McCrory | Feb. 6, 1940 |
| 2,237,014 | Stoehrer | Apr. 1, 1941 |